(No Model.)　　　　　　　　　　　　　　　　　2 Sheets—Sheet 1.
T. A. EDISON.
PHONOGRAPH.
No. 465,972.　　　　　　　　　　　Patented Dec. 29, 1891.
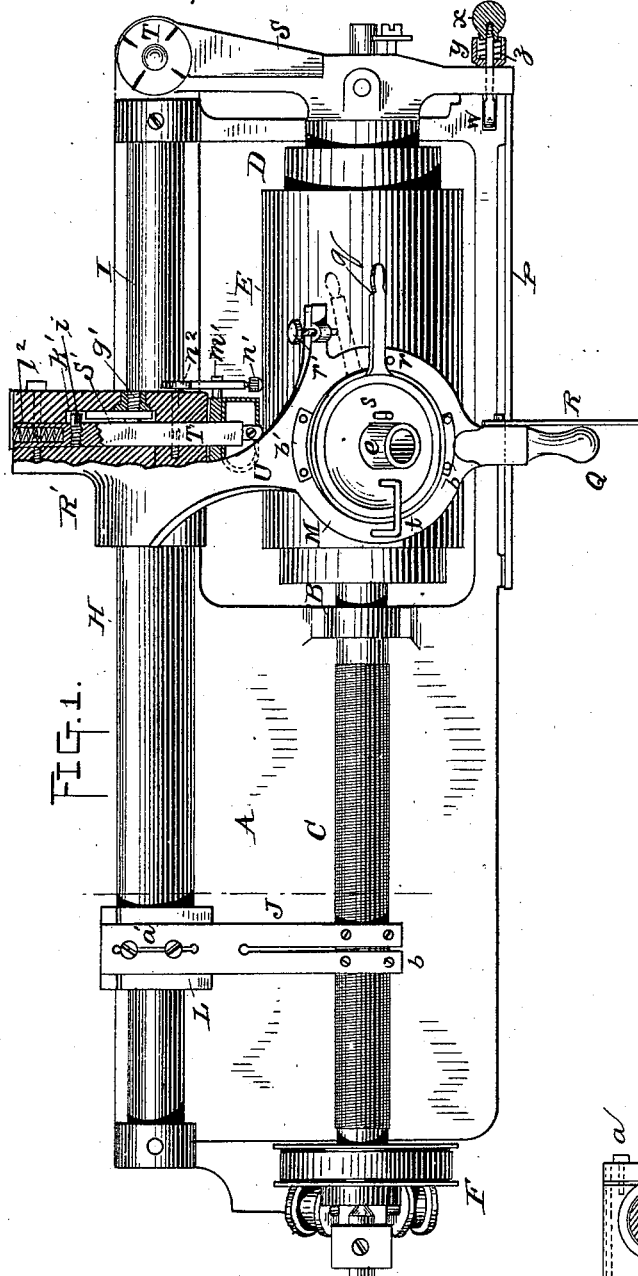
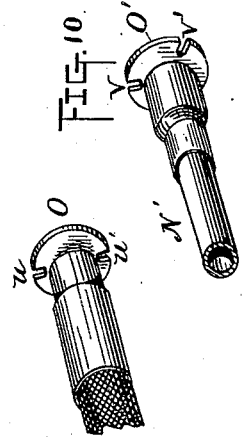
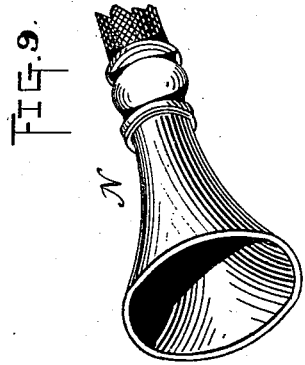
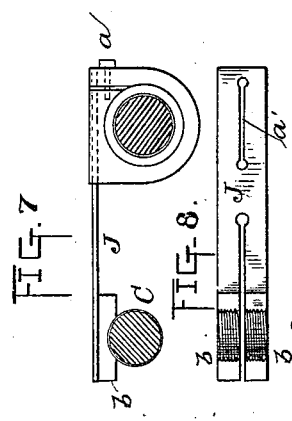
WITNESSES:
INVENTOR
Thomas A. Edison
BY
ATTORNEYS.

(No Model.)  T. A. EDISON.  2 Sheets—Sheet 2.
PHONOGRAPH.
No. 465,972.  Patented Dec. 29, 1891.
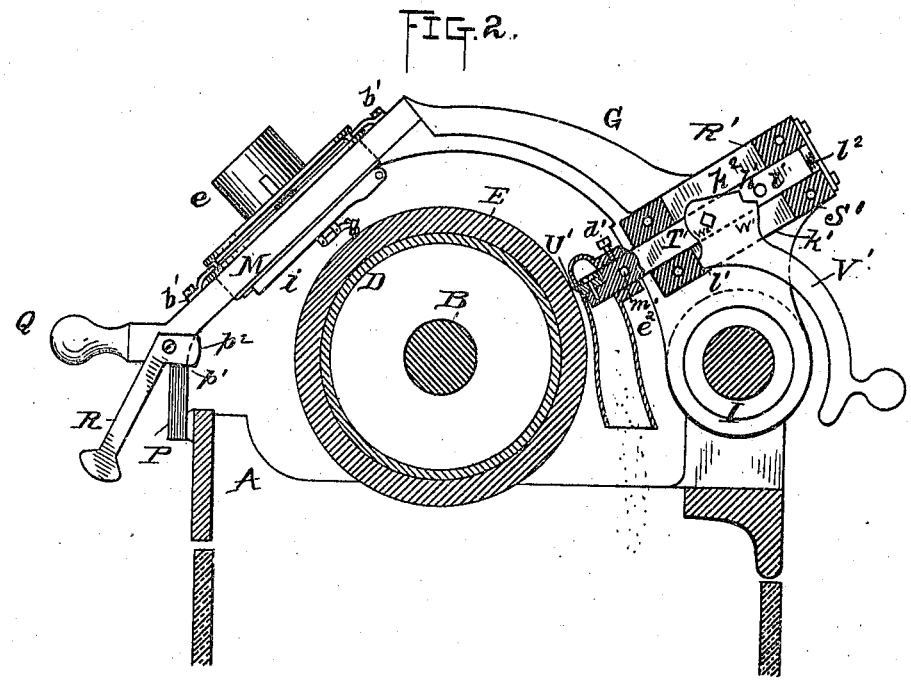
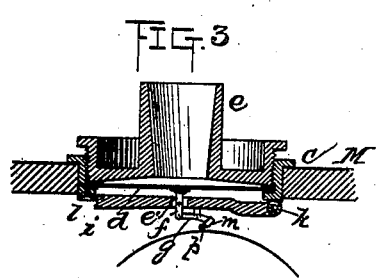
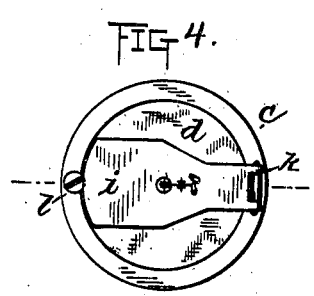
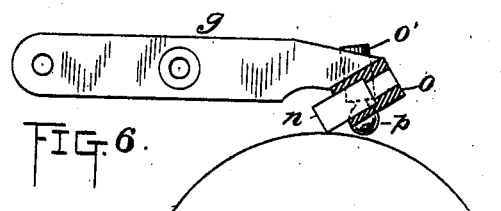
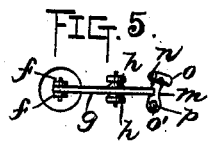
WITNESSES:
INVENTOR
Thomas A. Edison
BY
ATTORNEYS

UNITED STATES PATENT OFFICE.

THOMAS A. EDISON, OF LLEWELLYN PARK, NEW JERSEY.

PHONOGRAPH.

SPECIFICATION forming part of Letters Patent No. 465,972, dated December 29, 1891.

Application filed November 18, 1889. Serial No. 330,789. (No model.)

*To all whom it may concern:*

Be it known that I, THOMAS ALVA EDISON, a citizen of the United States, residing at Llewellyn Park, in the county of Essex and State of New Jersey, have invented certain new and useful Improvements in Phonographs, (Case No. 847,) of which the following is a specification.

The object of my invention is to increase the simplicity in construction and operation of the phonograph by decreasing the number of parts of which the machine is composed, by lessening or avoiding the necessity for adjustment of the various parts in practice, and by increasing the convenience of manipulation of the machine. To this end I have made many changes in the machines described in my previous patents and applications, all with the objects of increased simplicity, convenience, and efficiency.

Heretofore I have employed separate diaphragms and holders therefor for the recording and reproducing points, these being held in the two eyes of a spectacle-frame, supported so that either could be swung into position over the phonogram-cylinder.

One feature of my invention is an improvement upon this arrangement; and it consists in attaching both the recording-point and the reproducing point to the same diaphragm, and so arranging the parts carrying such diaphragm that by a simple movement either the recording or the reproducing point may be placed in operative position. I so connect these parts with the diaphragm that no adjustment of the recording-point is required to give the right depth to the record, it being so arranged that it will itself assume the proper position on the record-surface. In addition to this feature, which is perhaps the most important of the improvements which constitute my present invention, I have further improved the construction and use of the turning-off tool for removing the record from the cylinder, the devices for supporting the frame which carries the recorder and reproducer and for raising the same off the phonogram surface, the feeding devices for moving the recorder and reproducer along the cylinder, the means for attachment of mouth-pieces or ear-tubes to the machine, and the means for holding the cylinder in place.

My invention is illustrated in the accompanying drawings.

Figure 1 is a top plan view of the phonograph embodying my invention, the motor or other means for revolving the cylinder being omitted and the holder for the turning-off tool being shown in longitudinal section; Fig. 2, a transverse vertical section of the machine; Fig. 3, a vertical section of the improved recorder and reproducer; Fig. 4, a bottom plan view of the same; Fig. 5, an enlarged bottom view of the recorder and reproducer without the diaphragm and frame;
Fig. 6, an exaggerated side elevation and partial section of the recording and reproducing points; Fig. 7, a sectional view of my improved feeding device; Fig. 8, a bottom view of the same; Fig. 9, a perspective view of the mouth-tube used with the machine, and Fig. 10 a perspective view of a part of the ear-tube.

The machine is mounted upon a suitable base A.

B is the cylinder-shaft, provided with the feed-screw C.

D is the phonogram-cylinder, and E the phonogram-blank placed thereon.

The shaft B is rotated by a belt passing over the pulley F from a suitable motor or in any other convenient way. The rocking holding-arm G is carried by a sleeve H, sliding on the rod I, and such sleeve carries the traveler-arm or feeding device, which consists of a flat spring J, secured to a collar L, which is clamped upon the sleeve H by a screw a. The spring J is split at its outer end and carries two nut-sections b b, which engage the feed-screw C and are provided with fine threads corresponding to the thread C. This furnishes a more simple arrangement than that heretofore used by me. The flexibility of the spring holds the threads in engagement, and the spring being split a divided arm is formed, so that in case one nut-section fails to engage the feed-screw the other will, they being substantially independent. By means of the slot a' the feed-arm is adjusted in the manufacture of the machine to the right position.

The rocking arm G carries at its outer end a single circular receptacle M, instead of an adjustable spectacle-frame, as heretofore.

The receptacle M holds the combined recorder and reproducer, the external parts of which are made substantially as heretofore. The annular frame c is set in the receptacle M and adapted to turn therein, being held by two spring-clips b' b', and such frame holds the diaphragm d, and the tube attachment e is screwed into said frame. Attached to the center of the diaphragm by cement or in any suitable manner is a post e', from which extend two links f, connected with which is a lever g, which is also pivoted between lugs h, depending from the flat plate i, which is pivoted at k on the frame c and supported at its other end by the head of a small screw l.

Fixed upon the free end of the lever g is a cross-piece m, which carries the recording and reproducing points. These are preferably of the character shown and described in a previous application filed April 10, 1889, Serial No. 306,670, the recording-point having a circular gouging edge and the reproducing-point being in the form of a ball or sphere. The recording-point n is held in a sleeve o at an angle across one end of the cross-piece m, and the reproducing-point p is carried in a similar sleeve o', extending directly from the face of said cross-piece.

It will be seen that by turning the collar c in the receptacle M either the recording-point or the reproducing-point will be brought into operative position on the phonogram-blank. As illustrated in Fig. 6, the recording-point is in contact with the surface and the reproducing-point is thrown off; but by turning the holder it will be seen that these positions will be reversed, the reproducing-point will be brought against the cylinder and the recording-point thrown out of contact therewith.

For convenience of manipulation I provide a handle q upon the outer ring of the holder and the receptacle M. I place a stop-pin r and an adjustable screw r' for limiting the movement of said handle and so determining the movement which may be given to the recording and reproducing points.

In order that the position of the reproducing-point may be adjusted laterally when necessary to bring it into the track of the record, I make the stop r' on one side adjustable. No other adjustment is required for either the recording or reproducing point, as will be explained. I place on the exterior of the diaphragm-holder a pin s and on the receptacle M, I place another bent pin t, which extends over the holder in the manner shown. I make the speaking-tube N, which fits upon the machine, with a plate O at its inner end, such plate having two notches u u' opposite each other, so that when the tube is placed on the machine with the pins s t in the position shown in Fig. 1 the notches u u' will fit over the said pins. The said pins are thus situated when the recording-point is on the cylinder, which is the time when the tube N is to be used; but when the parts are turned to bring the reproducing-point into operation the pin s is moved away from its first position, so that the mouth-piece cannot be placed on the machine. I provide the ear-tube N' with a plate O' at its inner end, with notches v v' in such position as to engage the pins s t when the reproducer is in position. This device furnishes an indication of which point is on the cylinder, since only the proper tube for use at each time can be attached to the machine.

The outer end of the receptacle M rests upon a guide-rest P, as heretofore, and is provided, in addition to the handle Q for raising it off the record, with a pivoted handle R, having a cam-head, of which one side $p'$ is square and the other side $p^2$ is curved. In lowering the receptacle upon the cylinder the handle R is held, together with the handle Q, so that the head is turned and the curved side $p^2$ reaches the guide-rest before the receptacle M and before the recording or reproducing point strikes the record. The handle R then being allowed to fall, the cam-head turns to its flat side and lets the point easily down upon the record. Raising the handle R, so as to turn the cam-head, lifts the receptacle sufficiently to raise the point off the record and disengage the nut-sections from the feed-screw, so that the forward movement of the recorder or reproducer is stopped, so as to allow the parts to be slid back to the starting position.

No adjustment for any part is required at the guide-rest, as heretofore, by reason of the provision of the weight i. Such weight is made such as by its pressure on the recording-point to cause the same to enter the record material to the desired depth. The material used is preferably of a hard and brittle nature. The resistance to the entrance into the material of the gouging recording-point increases the farther it enters, and when it reaches the desired depth such resistance becomes so great as to lift the weight, and the point will penetrate no farther. This is the same no matter how the size of the cylinder may be decreased by turning it off, of course within the limits for which the machine is constructed. The reproducing-point will of course go to the bottom of the record, it being adjusted laterally, if necessary, by screw r'. The weight i also serves as a retarding device, such as is described in a prior patent permitting the sound-vibrations to be transmitted to and from the diaphragm, but taking up any movements due to irregularities in the shape of the cylinder and preventing such movements from affecting the diaphragm.

By arranging the recording and reproducing points as described I am enabled to place the knife which I employ for turning off the surface of the cylinder to remove a record at a distance from the recording and reproducing points. I place it at the rear portion of the rocking holding-arm, and I arrange it so that the depth of the cut may be precisely determined. I place the knife at the end of a stem which is constantly held forward by a spring, and I provide an adjustable stop engaging the cylinder surface, which enables the distance to which the knife is pressed forward to be altered according to the size of the cylinder, and which is swung off the cylinder by the turning movement thereof. I provide, also, a simple device for moving the knife off the cylinder and for locking the knife against the cylinder and away from it, and I so arrange this that the throwing back of the rocking holding-arm will trip such device and move the knife back, so that when the arm is lowered again to bring the recording-point into position the knife will be off the surface.

The rocking holding-arm has a rearwardly-extending projection $R'$, one side of which is flat, and to this is secured by screws a square guide $S'$, in which slides a square stem $T'$, which carries at its end the knife $U'$. Secured by a set-screw $d'$ to said stem is the metal chute $e^2$ for conveying the shavings from the knife, the stem passing through such chute and projecting through a small hole against the cylinder, so that the material removed by the knife passes through the hole into the chute and is conveyed away from the cylinder. Pivoted on a screw $g'$, which passes through the guide-wall is a lever $V'$, which passes out through a slot $k'$ in said guide, and whose head plays in said slot and in slot $k^2$ opposite it. The head of said lever has a notch $h'$ to engage a pin $i'$ on the stem $T'$ and a projection $l'$ arranged to strike the end of the slot $k'$. The outer end of the stem $T'$ is cored and receives a light spring $l^2$, which presses the stem and knife forward. The lever $V'$ is of such length as to strike the back of the machine when the rocking holding-arm is thrown back.

Pivoted loosely at the side of the stem $T'$, between the chute and the end of the guide, is a pin $m'$, having a head $n'$ adjustable longitudinally on said pin, the other end $n^2$ of said pin being weighted.

In operation, when it is desired to use the turning-off tool, the rocking holding-arm is lowered upon the cylinder, the head $n'$ being adjusted so as to cause the knife to enter the cylinder to the requisite depth, the spring forcing the knife forward. The lever is then lowered into the position shown in Fig. 1, and this gives the screw a turn and sets it against the stem $T'$, so that such stem is held in position and prevented from moving in either direction. The revolution of the cylinder moves the head of the loose pin away from it, so that it will not injure the surface. When the turning-off operation is concluded, the handle may be tripped by hand, if desired, the same being thrown back, so as to loosen the screw, and the notch engages the pin and moves the stem $T'$ back. The notch passes over the stem so that the edge $w'$ rests against the pin and the edge $w^2$ against the lower end of the slot $k'$, whereby the knife is held back and does not touch the cylinder when the rocking holding-arm is again lowered. Instead of tripping the handle by hand, if the rocking holding-arm is thrown all the way back the end of the handle will strike the back of the machine and be moved thereby, so as to lock the knife in its rearward position, as explained. During the turning-off operation the diaphragm-handle may be turned to its middle position, so that both the recording-point and the reproducing-point will be removed from the surface, or of course, if desired, a new record may be made while the old one is being removed.

Another improvement is in the clamping device for the swinging arm at the end of the cylinder. This consists in the use of a spring for holding said arm in place. The arm is represented at S, being pivoted at T, and the clamping device is pivoted, as heretofore, at $w$ and enters from below a slot in the end of the arm S. The head $x$ for moving the clamping device has heretofore been made adjustable, so as to be screwed up against the arm S. I now provide the clamping device with a sliding sleeve $y$, containing a stationary spring $z$, which, when the clamping device is raised, holds the sleeve $y$ against the arm S and locks the parts without any further movement on the part of the operator.

What I claim is—

1. In a phonograph, the combination, with a diaphragm, of a recording-point and a separate reproducing-point connected therewith and adapted to be brought alternately into operative relation with the same surface, substantially as set forth.

2. In a phonograph, the combination, with a diaphragm, of a recording-point and a separate reproducing-point connected with said diaphragm on the same side thereof, substantially as set forth.

3. In a phonograph, the combination, with a diaphragm, of a recording-point and a reproducing-point connected therewith and means for moving said points so as to bring either of them into operative position with relation to the same surface, substantially as set forth.

4. In a phonograph, the combination of a diaphragm, an arm connected therewith, and a recording-point and reproducing-point attached to said arm at different angles, substantially as set forth.

5. In a phonograph, the combination of a diaphragm supported so as to have a turning movement and a recording-point and reproducing-point carried thereby at different angles, substantially as described.

6. In a phonograph, the combination of a diaphragm set in a movable frame and a recording-point and a reproducing-point connected therewith and adapted by the movement of said frame to be brought alternately into operative relation to the same surface, substantially as set forth.

7. In a phonograph, the combination of a receptacle, a diaphragm held movably in said receptacle, a handle connected with said diaphragm, and a recording-point and a reproducing-point carried by said diaphragm, substantially as set forth.

8. In a phonograph, the combination of a diaphragm, an arm pivotally connected with said diaphragm, a cross-piece on said arm, and a recording-point and reproducing-point carried at the ends of said cross-piece, respectively, substantially as set forth.

9. In a phonograph, the combination of a diaphragm, an arm pivotally connected with said diaphragm, a cross-piece on said arm, a recording-point held at an angle across one end of said cross piece, and a reproducing-point extending from the face of said cross-piece at its other end, substantially as set forth.

10. In a phonograph, the combination of the diaphragm, the recording and reproducing points connected with said diaphragm, and a retarding device common to both points; substantially as set forth.

11. In a phonograph, the combination of a diaphragm, a lever connected therewith, separate recording and reproducing points carried by said lever, and a retarding device for said lever, substantially as set forth.

12. In a phonograph, the combination of a diaphragm, a recording-point and a reproducing-point connected therewith, and a loose weight pressing upon said points, substantially as set forth.

13. In a phonograph, the combination of a diaphragm, a lever connected therewith, a recording-point and a reproducing-point attached to said lever, and a loose weight pressing upon said lever, substantially as set forth.

14. In a phonograph, the combination, with the turning diaphragm carrying both the recorder and the reproducer, of the guides for determining the position of the speaking-tube and ear-tube, substantially as set forth.

15. In a phonograph, the combination of the receptacle, the annular frame turning therein, the diaphragm held by said frame, the recording and reproducing points connected with the diaphragm, the guide-pin on the turning frame, the guide-pin on the stationary receptacle, and the speaking-tube and ear-tube having notches differently situated, substantially as set forth.

16. In a phonograph, the combination of the feed-screw, the movable part carrying the recorder and reproducer, and the divided feeding-arm engaging said feed-screw, substantially as set forth.

17. In a phonograph, the combination of the feed-screw, the movable part carrying the recorder and reproducer, and the split spring carrying the nut-sections engaging said feed-screw, substantially as set forth.

18. In a phonograph, the combination of the pivoted holder carrying the recorder and reproducer, the guide-rest, and the pivoted handle for said holder, having a cam-head, substantially as set forth.

19. In a phonograph, the combination of the rocking holding-arm carrying the recorder and reproducer, the feed-screw, the traveler-arm connected with the rocking holding-arm and engaging said feed-screw, and the pivoted handle for the rocking holding-arm, having a cam-head engaging said guide-rest, substantially as set forth.

20. In a phonograph, the combination of the turning-off knife, the guide in which said knife slides, and the spiral spring within said guide behind said knife for pressing said knife forward, substantially as set forth.

21. In a phonograph, the turning-off knife, in combination with a spring for pressing the same forward and the adjustable pivoted stop for limiting the forward movement, substantially as set forth.

22. In a phonograph, the combination of the turning-off knife, a spring for pressing the same forward, and a clamp for locking the same in position, substantially as set forth.

23. In a phonograph, the combination of the guide, the knife-stem sliding in said guide, a clamp for locking said stem in any position, and a handle for moving said clamp, substantially as set forth.

24. In a phonograph, the combination of the guide, the knife-stem sliding therein, a clamp for holding said stem in position, and means for releasing said clamp, operated by a movement of the rocking holding-arm, substantially as set forth.

25. In a phonograph, the combination of the rocking holding-arm, the turning-off knife sliding through a guide on said arm, the clamp for locking said knife, and a projection from said clamp, adapted to strike the back of the machine when the arm is thrown back, substantially as set forth.

26. In a phonograph, the combination of the slotted guide, the knife-stem sliding therein, and the locking and releasing handle for said stem, projecting through said slot, substantially as set forth.

27. In a phonograph, the combination of the slotted guide, the knife-stem sliding therein, and the pivoted handle having a cam-head for moving said stem, substantially as set forth.

28. In a phonograph, the combination of the guide, the knife-stem sliding therein, the set-screw adapted to set against the stem, and the handle pivoted on said screw for moving said stem, substantially as set forth.

29. In a phonograph, the combination, with the turning-off knife, of the conveying-chute supported upon said knife, substantially as set forth.

30. In a phonograph, the combination of a conveying-chute and a turning-off knife passing through said chute, and with its edge projecting through an aperture in said chute, substantially as set forth.

31. In a phonograph, the combination of the movable diaphragm carrying both the recording-point and the reproducing-point, and the stops limiting the movement of said diaphragm, substantially as set forth.

32. In a phonograph, the combination of the movable diaphragm carrying both the recording-point and the reproducing-point, and the stops limiting the movement of said diaphragm, the stop which controls the movement for throwing in the reproducing-point being adjustable, substantially as set forth.

33. In a phonograph, the combination of the recording-point and reproducing-point carried by the same diaphragm, means for moving said points so as to bring either of them into operative position, and means for adjusting the position of the reproducing-point laterally to the record, substantially as set forth.

34. In a phonograph, the combination, with the movable diaphragm, and the holder carrying the recording-point and reproducing-point, of the spring-clips for holding the same in place, substantially as set forth.

35. In a phonograph, the combination of a gouging recording-point and a spherical reproducing-point carried by the same diaphragm, substantially as set forth.

36. In a phonograph, the combination of a cutting recording-point and a blunt reproducing-point carried by the same diaphragm, substantially as set forth.

37. In a phonograph, the combination, with the swinging arm for holding the cylinder in place, of the spring-lock for said arm, substantially as set forth.

This specification signed and witnessed this 14th day of November, 1889.

THOS. A. EDISON.

Witnesses:
D. H. DRISCOLL,
WILLIAM PELZER.